US005643069A

United States Patent [19]

Christiansen et al.

[11] Patent Number: 5,643,069

[45] Date of Patent: Jul. 1, 1997

[54] DRILL FOR DRILLING BRITTLE MATERIALS

[75] Inventors: Uwe Christiansen, Gelnhausen; Dagobert Knieling, Hanau; Andreas Schultheis, Langenselbold, all of Germany

[73] Assignee: Heraeus Quarzglas GmbH, Hanau, Germany

[21] Appl. No.: 531,413

[22] Filed: Sep. 21, 1995

[30] Foreign Application Priority Data

Sep. 23, 1994 [DE] Germany ........................ 44 34 025.7

[51] Int. Cl.[6] ........................ B23F 21/03

[52] U.S. Cl. ........................ 451/540; 175/387

[58] Field of Search ........................ 451/540, 542, 451/543, 58, 61, 541, 545-547, 488, 449, 178, 231; 407/12; 408/145, 224, 83; 175/387, 391, 434

[56] References Cited

U.S. PATENT DOCUMENTS

| | | | |
|---|---|---|---|
| 3,259,959 | 7/1966 | Tobey | 451/541 |
| 3,517,463 | 6/1970 | Niemiec | 451/542 |
| 3,621,548 | 11/1971 | Kinley et al. | 407/12 |
| 5,085,014 | 2/1992 | Sandhof | 451/488 |
| 5,123,217 | 6/1992 | Ishikawa et al. | 51/206 R |
| 5,354,155 | 10/1994 | Adams | 408/145 |
| 5,392,759 | 2/1995 | Kwang | 451/542 |
| 5,435,676 | 7/1995 | Yera et al. | 407/18 |
| 5,465,706 | 11/1995 | Sawluk | 451/542 |
| 5,503,506 | 4/1996 | Yuan | 407/18 |

FOREIGN PATENT DOCUMENTS

| | | |
|---|---|---|
| 1179525 | 10/1964 | Germany . |
| 1913317 | 8/1965 | Germany . |

OTHER PUBLICATIONS

"Forets Couronne, Core Drills, Bohrkronen" Diamant Boart (pre 1994).

*Primary Examiner*—James G. Smith
*Assistant Examiner*—Derris H. Banks
*Attorney, Agent, or Firm*—Felfe & Lynch

[57] ABSTRACT

A drill head carries a plurality of coaxially mounted drill crowns beginning with a first crown and followed by additional drill crowns which, upon rotation, describe concentric envelope circles of successively larger diameters. The first drill crown has cutting elements with a diamond coating with an average particle size of 200–1,000 μm, and the additional drill crowns have cutting elements with a diamond coating with an average particle size of 200–300 μm. The difference in diameter of succeeding drill crowns is successively small. Alignment of the drill crowns in a pilot hole is achieved by guide elements mounted behind the drill crowns and describing an inner envelope circle which is smaller than the outer envelope circle described by the largest drill crown, thereby defining a radial safety gap into which fluid is fed to form a cushion during rotation.

16 Claims, 3 Drawing Sheets

DRILL FOR DRILLING BRITTLE MATERIALS

BACKGROUND OF THE INVENTION

The present invention pertains to a process for drilling brittle materials, where, by means of a drill with a drill rod, at the forward end of which a drill head is mounted, this head carrying a drill crown which rotates around the longitudinal axis of the drill rod and which is provided with grinding or cutting means. The final hole is produced by the expansion of a pilot hole, the pilot hole being produced by a drill crown which, looking at the drill rod from the forward end in the direction of the longitudinal axis, is mounted on the drill head coaxial to and in front of the drill crown which produces the final hole.

The invention also pertains to a drill for brittle materials with a drill rod which can rotate around its longitudinal axis, at the forward end of which a drill head is mounted, this head carrying a first drill crown provided with a coating of abrasive particles, the outside dimensions of which, upon rotation around the axis of rotation, are associated with a first envelope circle, the head also carrying at least one additional drill crown, which, looking at the drill rod from the forward end in the direction of the longitudinal axis, is mounted behind the first drill crown, the outside dimensions of this second drill crown, upon rotation around the longitudinal axis, being associated with an envelope circle coaxial to the first envelope circle, the diameter of the second circle being larger than that of the first.

The product brochure entitled "Forets couronne, Core drills, Bohrkronen" from DIAMANT BOART illustrates drills which have a drill rod provided with an outside thread, by means of which the drill can be held in a drilling machine. At the forward end of the drill rod there is a drill head with a drill crown. The drill crown is in the form of a disk, which is partially recessed into the drill head. The lateral cylindrical surface of the drill crown and the end facing the material to be drilled are coated with diamond. The longitudinal axis of the drill rod represents the axis of rotation. When the drill head rotates together with the drill crown, the diamond coating acts as a grinding and cutting agent on the material to be drilled. The material is removed and a hole is thus produced. As the drill crown rotates around the axis of rotation, it describes an envelope circle, with a diameter which is the same as that of the drill crown. The diameter of the envelope circle also corresponds to the diameter of the hole produced.

A process and a drill of the general type in question are known from German Registered Design DE-GM No. 1,913, 317. In this document, a rock and stone drill with several step bits and a pilot drill are described. The pilot drill and the step bits, which are mounted coaxially on the same drill head, have different diameters. Looking in the direction of the drilling rod, these diameters increase from the pilot drill in approximately equal steps. This known drill is suitable for the drilling of rock and minerals.

A drilling tool with similar features is described in DE-AS No. 1,179,525. This drilling tool has a group of rotary drilling bits, the cutting surfaces of which are coated with diamonds embedded in a binder. In one embodiment, a pilot bit is provided, the outside diameter of which is smaller than the envelope circle of the rotary drilling bits, which, looking at the tip of the drill in the direction of the drill rod, are mounted coaxial to and underneath the pilot bit. The drilling tool can also have a second group of rotary drilling bits with smaller diameters. This drilling tool is suitable for the cutting type of drilling to produce blast holes in hard rock such as sandstone, quartzite, etc.

The known drills can be used to produce holes with relatively coarse inside surfaces in coarse and hard rock. When brittle materials are drilled, damage to the material is induced in the boundary zones of the hole. It has been found that, when brittle materials such as glass and ceramic are drilled, cracks are produced in the boundary zone. These cracks extend outward from the damage point into the interior of the glass for a short distance and then proceed essentially parallel to the cut surface. These elliptical, longitudinal cracks reduce the strength of the drilled material. The higher the mechanical stresses during the removal of the material, the more pronounced the processes of crack formation and propagation.

A deep drill in the form of a tube bit for drilling deep holes is known from Dubble II, 1966, p. 549, FIG. 134. This tube bit has a shaft, the forward end of which carries a drill head, which is able to rotate around the longitudinal axis of the shaft. The drill head carries a drill crown with a circular cross section; the crown is equipped with a cutting edge. Upon rotation of the drill head, the drill crown describes an envelope circle, which is the same as the diameter of the hole produced. In an area underneath the drill crown, the drill head is provided with elevations. Upon rotation round the longitudinal axis of the shaft, these elevations describe an envelope circle with a diameter which is also the same as that of the hole. The elevations thus prevent the drill from "wandering" and therefore increase the accuracy with which it is guided.

The process to be derived from the above description and the known drill are suitable for guiding the drill head during the drilling of deep holes in metals, but not in brittle materials. The impact of the rotating elevations against the inside walls of the hole produce additional cracks in the boundary zone. These bring about a further reduction in the strength of the brittle material in which the hole has been drilled.

SUMMARY OF THE INVENTION

The invention relates to process and apparatus for drilling deep holes in brittle materials with minimal damage to the material and precise guidance of the drill.

With respect to the process, an existing pilot hole is enlarged by a drill crown provided with a diamond coating with an average particle size in the range of 200–1,000 μm, and each additional increase in diameter is produced by a drill crown provided with a diamond coating with an average particle size in the range of 200–300 μm. As a result, very smooth holes are obtained with almost no damage to the material.

The first or forward drill crown enlarges an existing hole provided by a known drill or by rotation methods. The mechanical shear and impact stresses acting on the material as this work is being done generate a damaged boundary zone along the inside walls of the hole characterized by elliptical, longitudinal cracks. This damaged boundary zone is removed when the hole is further expanded. During the further expansion of the pilot hole, fresh damage is caused in the material. The extent of this new damaged boundary zone is minimized by expanding the hole only slightly, because then the mechanical forces which act on the inside walls of the hole are proportionately smaller. To produce the final hole, the hole can be expanded in a series of steps; the amount of material removed from the inside walls of the individual pilot hole in question can be kept small and can decrease from one hole diameter to the next. The individual drill crowns are mounted on a common axis, i.e., on the axis of rotation of the drill. Because the expansion to the final hole is accomplished by means of drill crowns which are coaxial to each other, it is guaranteed that the material is removed uniformly around the periphery of the pilot hole or of the individual hole in question, so that, again, the forces which occur during the drilling operation are distributed uniformly over the inside walls of the hole.

Extremely smooth holes with very little damage are obtained when the first pilot hole enlargement is produced by a drill crown provided with a diamond coating with an average particle size in the range of 570–740 μm.

Especially good results are achieved when a pilot hole is expanded at least three times in a stepwise manner to produce the final hole, the pilot holes being produced by means of at least two drill crowns, mounted on the drill head in front of, and coaxial to, the drill crown which produces the final hole. Provided that the depth of cut is kept small, the stepwise drilling to obtain the final hole guarantees that the damage zone will be extremely narrow. The depth of cut can also be reduced in steps from one hole to the next. In this regard, it has been found to be especially effective with respect to the production of the final hole to expand the diameter of the preceding hole only sightly, preferably by less than 0.8 mm.

A pressure cushion maintained between the guide element and the inside walls of the final hole reduces the possibility of contact between the guide element and the inside walls of the final hole, and in particular it prevents the rotating guide element from becoming jammed in the hole. The pressure cushion also smooths out the surface roughness of the inside walls of the final hole. The pressure cushion, therefore, guarantees that the guide element can guide the drill head without contacting the inside walls of the final hole.

A process in which the pressure cushion between the guide element and the inside walls of the final hole is maintained in a safety gap with a width of less than 0.05 mm, preferably with a width in the range of 0.01–0.03 mm, has been found to be especially advantageous. Gap widths in this range ensure good guidance accuracy while simultaneously reducing the danger that the guide element can become jammed in the final hole to a negligible level.

Especially good results are obtained with a process in which the pressure cushion is maintained by supplying a fluid to the final hole. Fluids are easy to manage, and they can act simultaneously as lubricants for the drill crown. It has been found especially advantageous to supply a fluid to the final hole from the outside through channels provided in the guide element. In a process such as this, no additional feed lines for the fluid are required, which could possibly interfere with the drilling operation or which could get jammed in the hole.

A process in which several guide elements uniformly distributed around the circumference of the drill head are provided for the guidance of the drill head in the final hole has proven to be advantageous. The uniform distribution prevents out-of-balance conditions. At the same time, the accuracy with which the drill is guided in the hole is increased. For this purpose, the guide elements can be, for example, provided on the drill head in a plane perpendicular to the axis of rotation of the drill and/or in a plane parallel to the axis of rotation.

It is possible to drill deep holes with very little damage and with very precise guidance of the drill by means of a process in which an existing hole is expanded to the final hole by means of a drill with a drill rod, at the forward end of which a drill head is mounted, the drill head carrying a drill crown which rotates around the axis of the drill rod and which is provided with grinding or cutting means. The drill head is guided in the final hole by means of a guide element mounted behind the drill crown. To produce the final hole, a pilot hole is expanded stepwise by coaxial drill crowns while a pressure cushion is maintained between the guide element and the inside walls of the final hole. The stepwise drilling-out of the final hole by means of a graduated series of drill crowns, the individual drill crowns being mounted on a common axis of rotation as already explained above, makes it possible to produce a final hole with extremely smooth and almost undamaged inside walls. To preserve the quality of the inside wall thus produced, a pressure cushion is maintained between the guide element and the inside walls of the final hole. This cushion also makes it possible, even in the case of deep holes, to guide the drill head accurately in the final hole without exerting any undue load on the inside walls or causing excessive damage to them.

The drill crown closest to the forward end of the drill rod is preferably provided with a diamond coating with an average particle size of 200–1,000 μm; each additional drill crown is provided with a diamond coating with an average particle size in the range of 200–300 μm.

The diamond particles are so hard that they are able to scratch the glass and remove chips of material from its surface; most of the material is removed in this way. At shallow cutting depths, material is also removed by surface grinding. The depth of the damage can thus be kept shallow. Because the drill crown which is closest to the forward end of the drill rod in the direction of the longitudinal axis is provided with a diamond coating with an average particle size in the range of 200–1,000 μm, and because the following drill crowns have diamond coatings with average particle sizes in the range of 200–300 μm, the diamond particles become finer from one drill crown to the next. Thus it is possible to obtain a hole with extremely smooth, almost undamaged, and almost stress-free inside surfaces.

The longitudinal axis of the drill rod is the same as the axis of rotation of the drill. The first, forwardmost drill crown produces the first enlargement of the pilot hole in the material. The mechanical shear and impact stresses on the material produced during the drilling operation produce a damaged boundary zone with elliptical, longitudinal cracks along the inside walls of the hole. The second drill crown mounted behind the first drill crown has an envelope circle with a larger diameter. As it further expands the pilot hole, the damaged boundary zone is removed. During the expansion of the pilot hole, however, fresh damage is induced in the expanded hole, but the extent of this damage is shallow. The damaged boundary zone can be kept shallow by expanding the pilot hole only slightly, because then the mechanical stresses which occur during the drilling operation are proportionately smaller. Because the envelope circles of the drill crowns are coaxial to each other with respect to the axis of rotation of the drill, it is guaranteed that, when the pilot hole is expanded, the cutting depth and therefore the distribution of the mechanical stresses caused by the drilling operation remain uniform around the entire periphery of the pilot hole.

A drill which is especially suitable is one in which the drill crown which is closest to the forward end of the drill rod in the direction of the longitudinal axis is provided with diamond grit with an average particle size in the range of 570–740 μm. By means of a drill such as this, extremely smooth holes with almost no damage can be produced.

In a preferred embodiment of the drill, the drill head has at least three drill crowns, which are mounted one behind the other in the direction of the longitudinal axis of the drill rod seen from the forward end. The outside dimensions of these crowns are such that the envelope circles to be assigned to them upon their rotation around the longitudinal axis are coaxial to each other and increase in diameter from front to back. The diameters of the envelope circles to be described by the dimensions of the individual drill crowns can be selected so that, starting from the first expansion in diameter of the pilot hole, the degree to which the hole is expanded by each drill crown decreases successively. As a result, it is possible to produce a final hole with extremely smooth and almost undamaged inside walls. It has been found favorable to use four to six drill crowns. Again, because the envelope circles of the drill crowns are coaxial to each other, it is possible to remove the material uniformly all the way around the periphery of the preceding hole.

The last drill crown preferably has outside dimensions which, upon rotation, describe an envelope circle with a diameter which is less than 0.8 mm larger than the corresponding envelope circle of the next-to-last drill crown. Because the last drill crown expands the hole only slightly, only a small amount of material is removed under the exertion of only slight mechanical forces. Therefore, the stresses induced in the inside walls of the final hole are also slight, as is the depth of the damage zone thus produced.

It has been found effective for the drill to be designed with drill crowns which are coaxial to each other. As a result, especially the impact stress on the inside walls of the hole is avoided, such stress being observed in the case of drill crowns which are not coaxial to each other. The drill crowns can have the shape of, for example, disks or rings, which carry toothlike diamond bars at their outside circumference.

An embodiment of the drill has proven advantageous in which the drill crowns are designed essentially in the form of replaceable disks, and in which the disk surfaces facing the material to be drilled are divided into segments, which are coated with diamond. The design in the form of a disk makes it easy to stack and center the drill crowns on the drill head. Their replaceability ensures that the drill can be easily adapted to different demands with respect to the nature of the material and the type of drilling. The degree to which the diameters of the drill crowns are graduated from one crown to the next is variable. The diamond coating on the outside circumference can be in the form of diamond bars attached to the drill crown, such bars also being replaceable. If no pilot hole is present in the material, it may also be necessary to provide a diamond coating on the end surface of the first drill crown facing the material. For the first drill crown, diamond coatings with an inward-slanting end surface have been found effective. For the drill crowns following after the first, however, diamond coatings with end surfaces perpendicular to the axis of rotation of the drill head have been found to be more favorable.

The guide element has outside dimensions associated with an inner envelope circle which is coaxial to the outer envelope circle and which is smaller by a small safety gap than the outer envelope circle. The safety gap reduces the possibility of contact between the guide element and the inside walls of the hole, and in particular it prevents the rotating guide element from becoming jammed in the hole. The guide element can have the form of, for example, a strip or a spiral around the circumference of the drill head. A safety gap with a width of less than 0.05 mm, preferably with a width in the range of 0.01–0.03 mm, has been found to be especially advantageous. Gaps which are narrower than this range increase the danger that the guide elements will become jammed in the final hole; if the gaps are larger than the range indicated, the accuracy of the guidance function is decreased.

Preferably, several guide elements are provided, which, upon rotation around the longitudinal axis of the drill rod, have the same envelope circle. The guide elements are uniformly distributed around the circumference of this envelope circle. Guide elements of this type can have the form of, for example, strips attached to the circumference of the drill head or spiral elevations extending around the circumference of the drill body. Several guide elements uniformly distributed around the circumference of the envelope circle prevent out-of-balance conditions during rotation around the longitudinal axis.

It has also been found effective to provide several axially aligned guide elements which describe the same envelope circles, or to design the drill in such a way that the several guide elements form a single envelope surface in the form of a hollow cylinder. As a result, the guide accuracy is increased even more. Several envelope circles following after one another are obtained in an embodiment of the drill in which several guide elements are provided in the form of, for example, bar-like elevations mounted one behind the other, these elements being distributed around the circumference of the drill head, each one on its own plane perpendicular to the axis of rotation. An envelope surface in the form of a hollow cylinder is obtained in embodiments, in which the guide elements are designed as either continuous or interrupted, elongated elevations on the outside circumference of the drill head, these elevations either spiraling around or extending parallel to the longitudinal axis of the drill rod. An important point here is that the guide elements must be designed so that they still allow the material removed from the hole to be carried away.

It has been found especially advantageous to equip the drill head with mounting surfaces to which the guide elements can be fastened and removed when desired. The mounting surfaces can be provided, for example, with grooves or other fastening means, in which the guide elements are held without the possibility of slippage.

The drill head preferably has feed channels for gases and/or liquids, these channels extending from an inside bore to the outside surface and opening into a safety gap provided between the outer envelope circle and the inner envelope circle. This makes it possible not only to supply flushing medium to the drill crown but also to maintain a gaseous or liquid pressure cushion between the walls of the final hole and the guide elements. During drilling, contact between the guide elements and the inside walls of the final hole is thus prevented.

To build up a sufficiently effective pressure cushion, it has been found advisable to seal off the feed channels toward the outside by providing sealing means between the mounting surfaces of the drill head and the guide elements.

Where several guide elements in the form of guide bars are provided, these are fastened detachably to mounting surfaces of the drill head and essentially parallel to the longitudinal axis of the drill rod. It has been found favorable in this case to distribute at least four but no more than eight guide bars around the periphery of the drill head. It is advantageous for the width of the gap between the individual guide bars to be approximately the same as the width of the guide bars themselves. An especially high degree of guidance accuracy is obtained by mounting several of these guide bars one behind the other in a plane parallel to the longitudinal axis of the drill rod. The diameter of the outer envelope circle is preferably less than 0.1 mm larger, preferably only 0.02–0.06 mm larger, than that of the inner envelope circle described by the guide element.

The drill according to the invention has been found especially suitable for expanding holes in hollow, quartz glass cylinders. Quartz glass tubes are used, for example, as semi-finished products in the production of optical waveguides. Because of the methods used to produce holes in them, the surfaces of these holes are relatively rough and must be reprocessed. They can also follow a curved path inside the hollow cylinder. The drill according to the invention makes it possible to reprocess a hole such as this in an especially effective manner, as a result of which smooth and almost undamaged inside walls are obtained.

DETAILED DESCRIPTION OF THE PREFERRED EMBODIMENT

Figure 1:
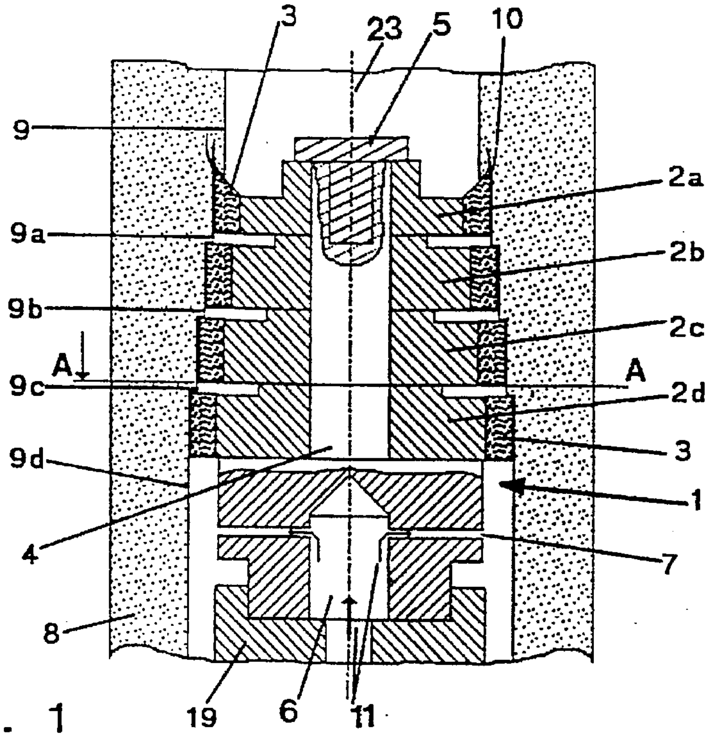
FIG. 1 is a schematic side section view of a drill according to the invention with several drill crowns forming a graduated series.

In FIG. 1, a drill head 1 is mounted at the forward end of a drill rod 19. A total of four disk-shaped, gear wheel-like drill crowns 2*a*, 2*b*, 2*c*, 2*d* are pushed onto a journal 4 at the end of drill head 1 and are held there by a screw 5 to prevent them from turning. Diamond bars 3 carrying a diamond coating are provided on the outside circumference of drill crowns 2*a*, 2*b*, 2*c*, 2*d*. In the case of drill crown 2*a* at the very front, the end surface of diamond bars 3 slant inward, whereas the end surfaces of diamond bars 3 of the other drill crowns 2*b*, 2*c*, 2*d* are perpendicular to axis of rotation 23 of drill head 1.

Figure 5:
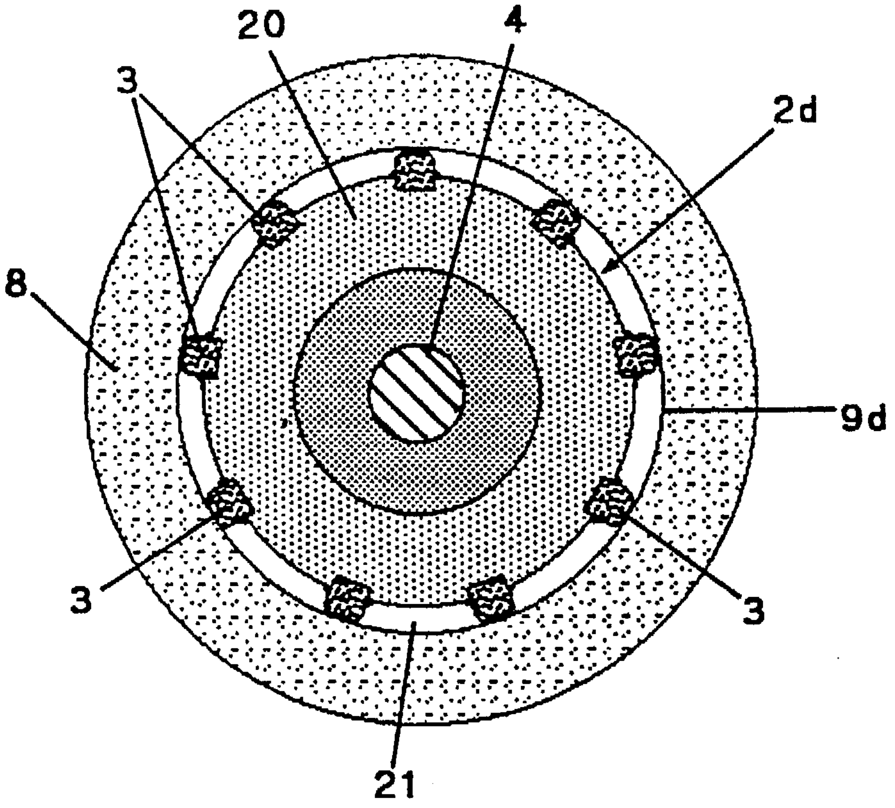
FIG. 5 is a plan section view taken along line A—A of FIG. 1.

The gear wheel-like design of drill crowns 2*a*, 2*b*, 2*c*, 2*d* is evident from the end view of drill crown 2*d* shown by way of example in the form of a schematic diagram in FIG. 5. The individual diamond bars 3, there being a total of nine of them in the case of drill crown 2*d*, are uniformly distributed around and brazed to the circumference of an essentially disk-shaped mounting body 20. The envelope circle associated with diamond bars 3 has a diameter which is the same as that of final hole 9*d*. The diameter of mounting body 20, however, is smaller than the diameter of final hole 9*d*, so that the drillings can be carried away through gap 21.

As can be seen from FIG. 1, drill head 1 has a central, internal bore 6, in the form of a blind hole at the bottom end. This hole is connected to the outside surface of drill head 1 by feed channels 7 for flushing fluid. Drill head 1 is inserted into a quartz glass tube 8; initial hole 9 in quartz glass tube 8 has a diameter which is smaller than that of drill crown 2*a* at the very front.

In the following, FIG. 1 is used as a basis for describing, by way of example, a method for producing deep holes in brittle materials by the use of the drill according to the invention. Drill crowns 2*a*, 2*b*, 2*c*, 2*d* are arranged in such a way that forwardmost drill crown 2*a* produces a pilot hole 9*a* first, in which, as a result, fine, longitudinal cracks 10 are formed. The following drill crowns 2*b*, 2*c* expand pilot hole 9*a* to produce holes 9*b*, 9*c*. The diameter of the pilot hole is expanded initially by 1.3 mm. Then hole 9*c* is produced, which represents an expansion of the diameter by 0.8 mm. As they remove layers of glass from the inside walls of the holes, drill crowns 2*b* and 2*c* remove the previously formed, fine longitudinal cracks 10. The last drill crown 2*d* expands previously formed hole 9*c* only slightly, i.e., by only about 0.5 mm, to produce the final hole 9*d* with a diameter of 40 mm.

During the drilling operation, flushing fluid passes through internal bore 6 in the direction of arrows 11 and thus arrives at drill crowns 2*a*, 2*b*, 2*c*, 2*d*. This fluid is then able to carry away the accumulating drillings through the gear wheel-like gaps.

Figure 2:
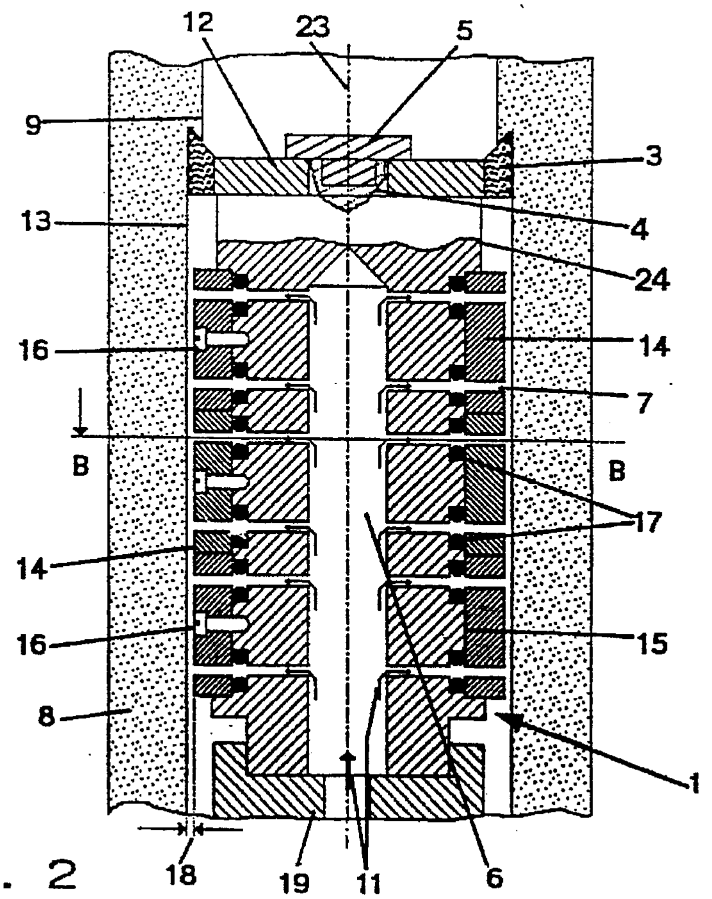
FIG. 2 is a schematic side section view of a drill according to the invention with several guide elements.

The same reference numbers are assigned in the figures to the same or equivalent parts. In FIG. 2, drill head 1 is equipped with a disk-shaped, gear wheel-like drill crown 12, provided with diamond bars 3 on its outside circumference. Drill crown 12 is fastened in a rotation-proof manner to drill head 1 by means of a screw 5. The diameter of drill crown 12 corresponds to that of a final hole 13 to be produced in quartz glass tube 8. i.e., to a diameter of 100 mm. The part of drill head 1 fastened to drill rod 19 is designed essentially in the form of a cylinder and has an internal bore 6 formed as a blind hole. This is connected to the outside surface of drill head 1 by feed channels 7 for flushing fluid. Guide bars 14 are supported in final hole 13 by a pressure cushion. These bars are able to rotate around the longitudinal axis of drill rod 19, which corresponds to axis of rotation 23. Guide bars 14 are uniformly distributed around the circumference of drill head 1 and are arranged in a plane perpendicular to axis of rotation 23. The distance between the individual guide bars 14 in the plane is approximately the same as the width of one of guide bars 14. In the exemplary embodiment according to FIG. 2, three planes occupied by guide bars 14 are provided, which, looking in the direction of axis of rotation 23, are mounted coaxially one behind the other. Guide bars 14 are made of hard metal and are fastened by screws 16 in retaining grooves (not shown) in vertically oriented mounting surfaces 15 on drill head 1. Feed channels 7 for the flushing fluid are sealed off toward the outside by elastic seals 17, which are installed between guide bars 14 and mounting surfaces 15.

In the following, a method for drilling deep holes in brittle materials by the use of the drill according to the invention is explained by way of example on the basis of FIG. 2. By means of drill crown 12, a final hole 13 is produced in quartz glass tube 8. The diameter of drill crown 12 is selected so that pilot hole 9 is expanded only slightly, i.e., by only 0.8 mm. As a result, the mechanical forces acting on the inside walls of hole 13 during the removal of the quartz glass are minimized, so that a relatively smooth and almost undamaged surface is obtained.

To improve the accuracy with which the drill is guided, the drill head according to FIG. 2 is provided with guide bars 14. So that these cannot become jammed against the inside walls of final hole 13 previously produced by means of drill crown 12, which would cause cracks in quartz glass tube 8, the envelope circle of guide bars 14 has a diameter smaller than that of hole 13. The width of safety gap 18 present between guide elements 14 and hole 13 is 0.01 mm. During the drilling operation, flushing fluid is forced through internal bore 6 of drill head 1 in the direction of arrows 11 to hole 13. As a result, a pressure cushion is built up between guide bars 14 and the inside walls of hole 13. This cushion guarantees that drill head 1 is guided accurately in the hole, without the need for any contact with the inside walls of final hole 13. At the same time, the flushing fluid serves to cool drill crowns 2*a*, 2*b*, 2*c*, 2*d* and to flush out the drillings which have accumulated.

Figure 4:
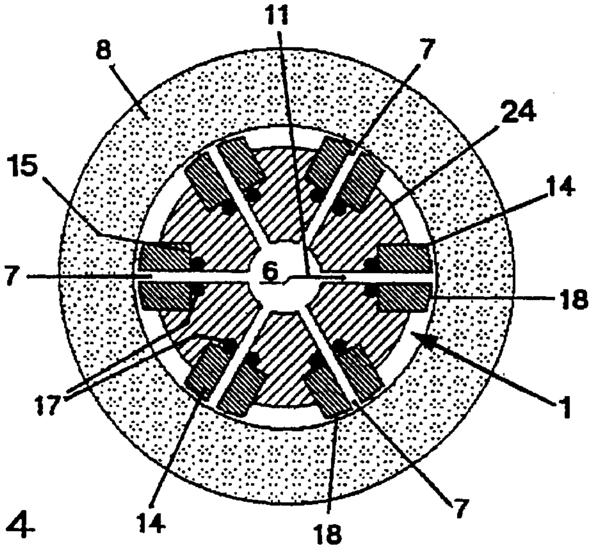
FIG. 4 is a plan section view taken along line B—B of FIG. 2.

The schematic diagram in FIG. 4 illustrates the design and function of guide bars 14. In the exemplary embodiment, six guide bars 14 are uniformly distributed around the circumference of drill head 1. Guide bars 14 project beyond lateral surface 24 of the cylinder of drill head 1. Upon rotation of drill head 1 around axis of rotation 23, these guide bars describe an envelope circle with a diameter which is smaller than the diameter of final hole 13 by an amount equal to twice safety gap 18. Feed channels 7 are sealed off toward the outside by seals 17 between guide elements 14 and mounting surfaces 15, as shown schematically in FIG. 4.

Several disk-shaped, gear wheel-like drill crowns 2*a*, 2*b*, 2*c*, 2*d*, provided with diamond bars 3 on their outside circumferences and end surfaces, are pushed onto a journal 4 at the end of drill head 1 and fastened there in a rotation-proof manner by means of a screw 5. Drill head 1 is inserted into a quartz glass tube 8, which has an initial hole 9, the diameter of which is about 5 mm smaller than the diameter of forwardmost drill crown 2*a*.

At its bottom end, drill head 1 has a central, internal bore 6, designed as a blind hole, which is connected to the outer surface of guide bars 14 by feed channels 7 for flushing fluid. To improve the accuracy with which it is guided, drill head 1 is provided with guide bars 14, which are supported by way of a pressure cushion in final hole 9*d*. Guide bars 14 are uniformly distributed around the circumference of drill head 1 and are mounted in planes perpendicular to axis of rotation 23. The distance between the individual guide bars 14 in a plane corresponds approximately to the width of guide bars 14. In the exemplary embodiment according to FIG. 3, three of these planes occupied by guide bars 14 are provided, which, looking from the front in the direction of axis of rotation 23, are mounted coaxially one behind the other. In each plane there are six guide bars 14, distributed uniformly around the circumference of drill head 1. Guide bars 14, which are made of hard metal, are fastened by screws 16 in retaining grooves (not shown) in vertically oriented mounting surfaces 15 of drill head 1. Feed channels 7 for the flushing fluid are sealed off toward the outside by means of elastic seals 17, which are installed between guide bars 14 and mounting surfaces 15. So that the guide bars cannot become jammed against the inside walls of final hole 9*d* produced previously by drill crown 2*d*, which would cause cracks in quartz glass tube 8, the envelope circle of guide bars 14 has a diameter which is smaller than that of final hole 9*d*. The width of safety gap 18 is 0.01 mm.

Figure 3:
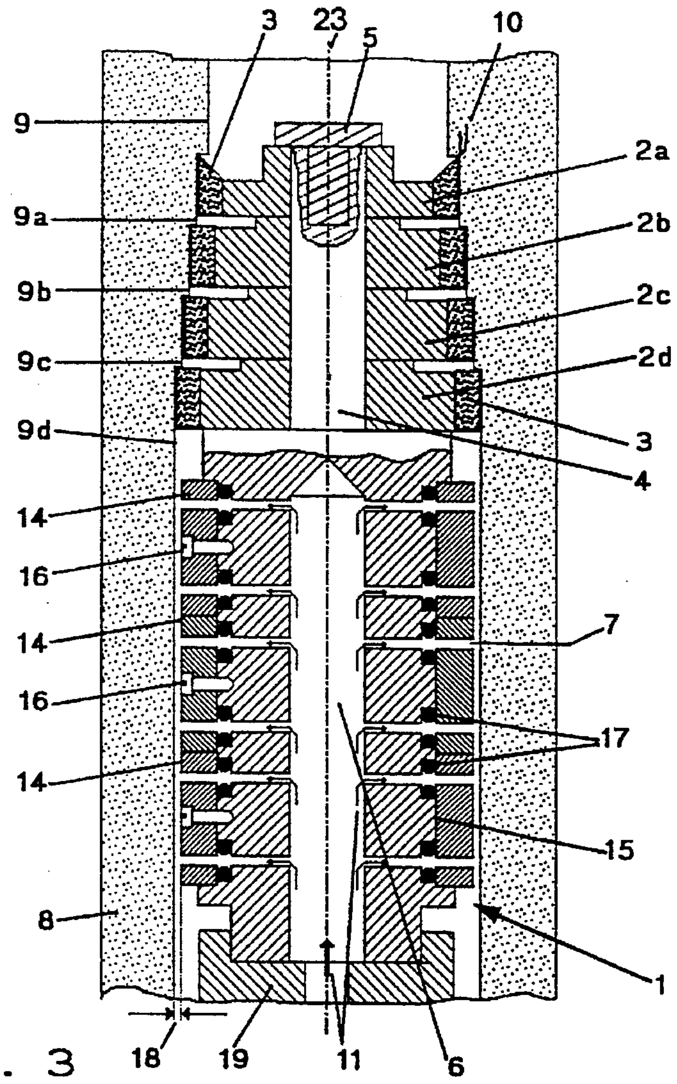
FIG. 3 is a schematic side section view of a drill according to the invention with several drill crowns forming a graduated series and with several guide elements.

In the following, a method for producing deep holes in brittle materials by the use of the drill according to the invention is explained by way of example on the basis of FIG. 3. Drill crowns 2*a*, 2*b*, 2*c*, 2*d* are arranged in such a way that drill crown 2*a* at the very front produces pilot hole 9*a* first, in which, as a result of the forces acting on the walls, fine longitudinal cracks 10 are induced. The following drill crowns 2*b*, 2*c* expand pilot hole 9*a* to produce holes 9*b*, 9*c*. The diameter of the pilot hole is expanded initially by 1.3 mm. Then hole 9*c* is produced, which represents an expansion of the diameter by 0.8 mm. As the layers of glass are removed from the inside walls of the holes, drill crowns 2*b*, 2*c* remove previously formed, fine longitudinal cracks 10. Drill crown 2*d* at the very end expands the previously formed hole 9*c* by only a slight amount, i.e., by only 0.5 mm, to obtain the final diameter of hole 9*d* of 60 mm. As a result of this graduation of the degrees to which the hole is expanded, the mechanical forces acting on the inside walls of holes 9*a*, 9*b*, 9*c* and especially 9*d* during the removal of the quartz glass are minimized, so that a smooth and almost damage-free surface is obtained.

During the drilling operation, flushing fluid is forced by way of internal bore 6 in the direction of arrows 11 through feed channels 7 to hole 9*d*. As a result, a pressure cushion is built up between guide bars 14 and the inside walls of final hole 9*d*. This cushion guarantees that drill head 1 is guided accurately without the need for contact with the inside walls of final hole 9*d*. At the same time, the flushing fluid cools drill crowns 2*a*, 2*b*, 2*c*, 2*d* and flushes out the accumulating drillings.

Because drill head 1 of the drill according to the invention is centered not from the outside but rather by hole 9*d* itself, produced by drill crowns 2*a*, 2*b*, 2*c*, 2*d*, it is also possible to redrill original holes which have wandered off track while removing material uniformly from the hole. This is achieved by means of guide bars 14, which always follow final hole 9*d*. At the same time, because of the step-like graduation of drill crowns 2*a*, 2*b*, 2*c*, 2*d* and because of the support of guide bars 14 on a pressure cushion, the inside walls of the final hole show almost no damage.

What is claimed is:

1. Drill for brittle materials, said drill comprising a drill rod having a forward end and a longitudinal axis of rotation, a drill head mounted at said forward end of said drill rod, a first drill crown mounted on said drill head distally with respect to said drill rod, said first drill crown having first cutting means which, when said drill is rotated, describes a first envelope circle, said first cutting means having a diamond coating with an average particle size in the range of 200–1,000 μm, at least one additional drill crown including a second drill crown mounted behind said first drill crown, said second drill crown having second cutting means which, when said drill is rotated, describes a second envelope circle coaxial to and larger than said first envelope circle, said second cutting means having a diamond coating with an average particle size in the range of 200–300 μm wherein said drill crowns are replaceable disks, said cutting means comprising a plurality of segments mounted on the circumference of each disk, said diamond coatings being provided on said segments.

2. Drill as in claim 1 wherein said first cutting means has a diamond coating with an average particle size in the range of 570–740 μm.

3. Drill as in claim 1 further comprising a third drill crown mounted behind said second drill crown and having third cutting means which, when said drill is rotated, describes a third envelope circle which is coaxial to and larger than said second envelope circle.

4. Drill as in claim 3 wherein said third envelope circle has a diameter which is less than 0.8 mm larger than the diameter of the first envelope circle.

5. Drill as in claim 3 further comprising at least one additional drill crown including a last drill crown which, when said drill is rotated, describes a last envelope circle which is coaxial to and larger than the immediately preceding envelope circle.

6. Drill as in claim 5 wherein said last envelope circle has a diameter which is less than 0.8 mm larger than the diameter of the immediately preceding envelope circle.

7. Drill for brittle materials, said drill comprising a drill rod having a forward end and a longitudinal axis of rotation, a drill head mounted at said forward end of said drill rod, at least one drill crown mounted on said drill head, said at least one drill crown having cutting means which, when said drill is rotated, describes an outer envelope circle, and guide means mounted to said drill head behind said at least one drill crown, said guide means describing an inner envelope circle which is coaxial to the outer envelope circle when the drill is rotated, said inner envelope circle having a diameter which is smaller than said outer envelope circle by a distance which defines a radial safety gap.

8. Drill as in claim 7 wherein said safety gap is less than 0.05 mm.

9. Drill as in claim 8 wherein said safety gap is 0.01 to 0.03 mm.

10. Drill as in claim 7 wherein said guide means comprises a plurality of guide elements on at least one level, said guide elements on each said at least one level being uniformly distributed around said axis.

11. Drill as in claim 10 comprising a plurality of levels of said guide elements relative to the longitudinal axis of the rod.

12. Drill as in claim 11 wherein each said guide element is aligned with a guide element in each other level to form a column of guide elements parallel to said axis.

13. Drill as in claim 10 wherein each guide element is provided with a radial feed channel and said drill head is provided with a central bore and channel means communicating with said radial feed channels, whereby a fluid can be fed from said central bore into said radial safety gap to form a fluid cushion between said inner and outer envelope circles.

14. Drill as in claim 7 further comprising means for feeding a fluid from inside said drill head radially outward into said radial safety gap, whereby a fluid can be fed into said radial safety gap to form a fluid cushion between said inner and outer envelope circles.

15. Drill as in claim 7 wherein said cutting means comprises a coating of abrasive particles.

16. Drill as in claim 15 wherein said coating comprises diamond particles.

* * * * *